United States Patent
Williams

[11] 3,906,849
[45] Sept. 23, 1975

[54] ELECTRIC BROILER

[76] Inventor: Theodore M. Williams, 847 Daytona Ave., Holly Hill, Fla. 32017

[22] Filed: Sept. 27, 1974

[21] Appl. No.: 509,901

[52] U.S. Cl. ........... 99/392; 99/389; 99/446; 99/467; 126/59.5; 126/299 B; 219/399; 219/408
[51] Int. Cl.² ........................................... A47J 37/08
[58] Field of Search .......... 219/396, 399, 400, 408, 219/409, 410, 411; 99/389, 390, 391, 392, 393, 400, 401, 402, 446, 447; 126/21 A, 59.5, 299 A, 299 B

[56] References Cited
UNITED STATES PATENTS

| | | | |
|---|---|---|---|
| 1,541,011 | 6/1925 | Vallos | 99/392 |
| 1,896,537 | 2/1933 | Bonaccorsi | 99/392 |
| 1,903,324 | 4/1933 | Codling | 99/392 |
| 2,109,079 | 2/1938 | Ziegler et al. | 99/390 X |
| 2,533,080 | 12/1950 | Alexander | 99/443 |
| 2,941,463 | 6/1960 | Di Cuia | 99/393 |
| 2,980,102 | 4/1961 | Vaughn | 126/59.5 |
| 2,994,760 | 8/1961 | Pecorado et al. | 219/409 |
| 3,086,449 | 4/1963 | Cahill | 99/446 |
| 3,154,005 | 10/1964 | Roecks et al. | 99/389 |
| 3,211,892 | 10/1965 | Swenson et al. | 219/411 |
| 3,285,239 | 11/1966 | Drake | 126/25 |
| 3,313,917 | 4/1967 | Ditzler et al. | 219/400 |
| 3,477,360 | 11/1969 | Raney | 99/446 X |
| 3,495,524 | 2/1970 | Miles | 219/399 |
| 3,524,403 | 8/1970 | Treloak et al. | 99/400 X |
| 3,583,307 | 6/1971 | Lee, Sr. | 126/59.5 X |
| 3,789,824 | 2/1974 | Mason | 126/59.5 |

*Primary Examiner*—Volodymyr Y. Mayewsky
*Attorney, Agent, or Firm*—John N. Randolph

[57] ABSTRACT

An electric broiler primarily intended for cooking meats, such as steaks and hamburgers, having a centrally disposed removable rack on which the food items to be cooked are supported and which is located between electrical heating elements. Packets containing food flavoring materials are supported by the heating elements and in close proximity thereto to be heated thereby, so that vapors from the heated flavoring material will escape therefrom into a cabinet or casing in which the rack and heating elements are contained. Air is admitted to the casing through adjustable vents located in close proximity to the flavoring packets to mix with and convey the vapors to the meat in response to the action of an exhaust fan located above the meat rack. Greases from the meat escape by gravity through a flame resistant bottom wall into a bottom drawer of the casing having an outlet port to which a conduit leading to waste or storage may be connected.

3 Claims, 4 Drawing Figures

3,906,849

ELECTRIC BROILER

SUMMARY

It is a primary object of the present invention to provide an electric broiler which may be efficiently utilized to quickly and easily broil various food items including steaks and hamburgers, in such a manner that the cooked items will have a distinctive and appetizing taste and aroma vastly different from the usual charred and burned fat affect derived from most charcoal type grills.

Another object of the invention is to provide a broiler the use of which will not result in cooked food items which can be injurious and unhealthy due to being impregnated with charcoal.

Still a further object of the invention is to provide a broiler the use of which does not pollute the atmosphere, as occurs when cooking with charcoal.

Still a further object of the invention is to provide an electric broiler having unique means for flavoring food products being cooked therein and wherein the degree of cooking and flavoring can be readily regulated.

Various other objects and advantages of the invention will hereinafter become more fully apparent from the following description of the drawings, illustrating a presently preferred embodiment thereof, and wherein:

DESCRIPTION OF THE PREFERRED EMBODIMENT

Figure 2:
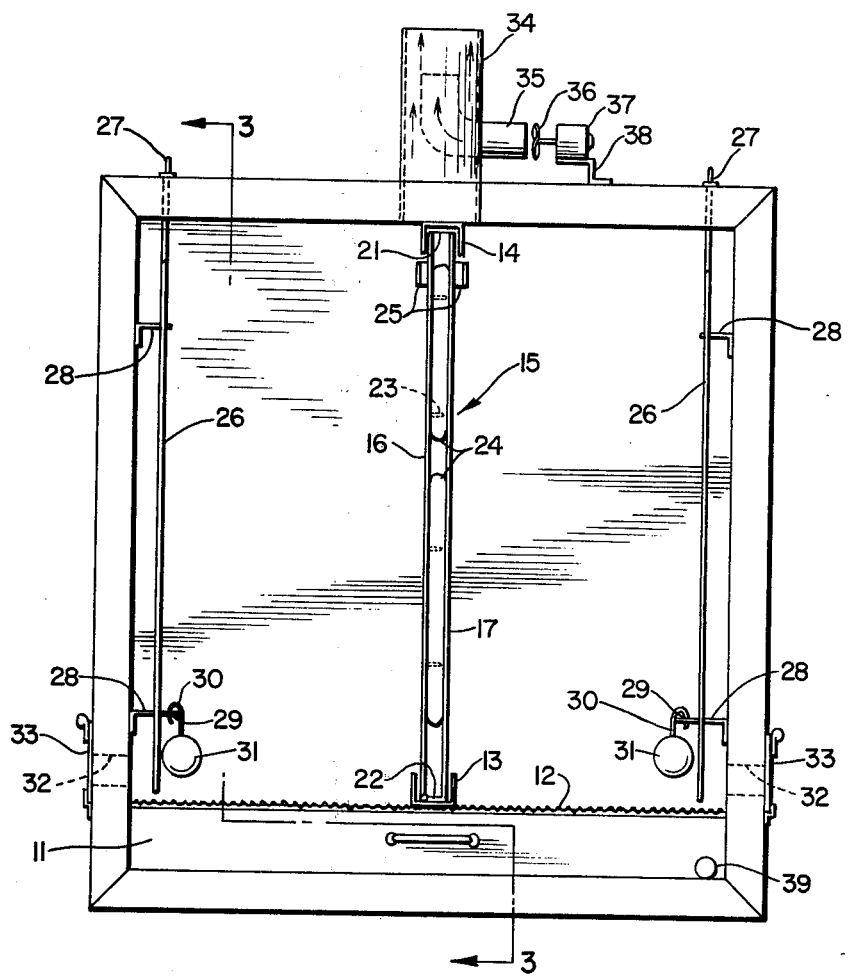
FIG. 2 is an enlarged front elevational view thereof, with the front doors of the casing removed.
Figure 3:
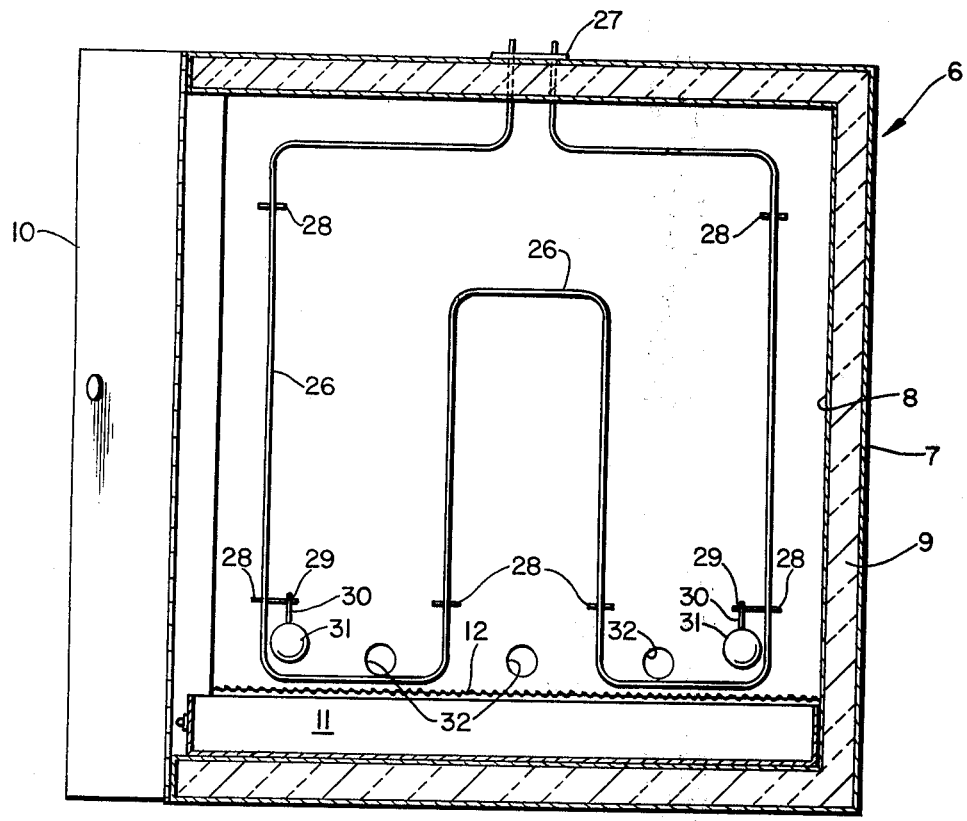
FIG. 3 is a vertical sectional view taken substantially along the line 3—3 of FIG. 2 and including a showing of one of the front doors.
Figure 4:
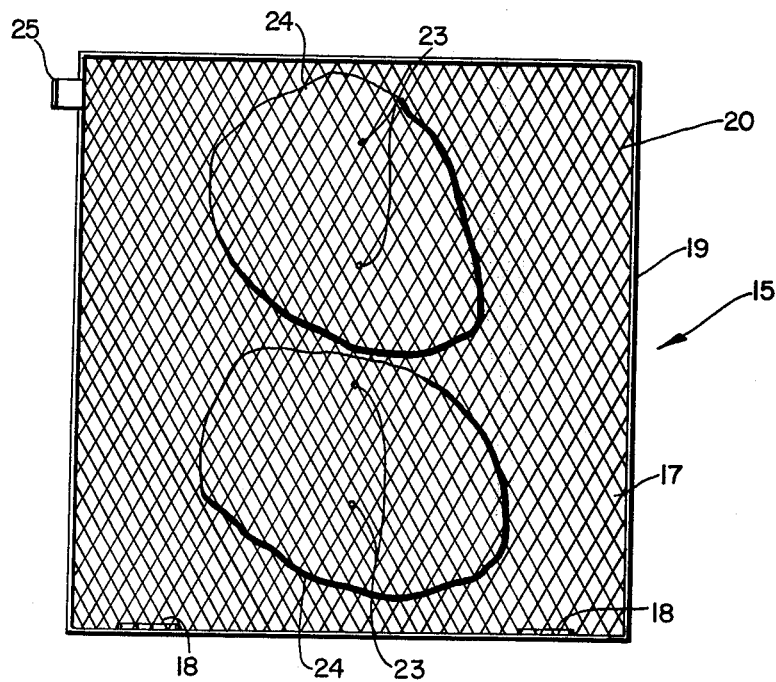
FIG. 4 is a side elevational view of the meat rack shown detached from the casing.

Referring more specifically to the drawings, the electric broiler in its entirety is designated generally 5 and includes a cabinet 6, the bottom, top, rear wall and side walls of which are composed of an outer jacket 7, an inner jacket or liner 8 and asbestos insulation 9 filling the space between the jacket 7 and liner 8. The open front of the cabinet 6 is closed by a pair of doors 10 which are hinged along their outer vertical edges. As seen in FIGS. 2 and 3, a drawer 11 is slidably mounted in the bottom of the cabinet 6, adjacent to and beneath a foraminous sheet 12 of a flame resistant material which is suitably supported by the side walls and rear wall of the cabinet.

The foraminous member 12 supports an upwardly opening channel member 13 which extends substantially from front to rear of the cabinet 6 and which is disposed midway between the cabinet side walls. A corresponding downwardly opening channel 14 is secured to the underside of the top wall of the cabinet directly above the channel 13 and is substantially coextensive therewith. Channels 13 and 14 slidably support a removable rack 15 for containing items to be cooked and which is composed of two similar sections 16 and 17 which are hinged together at 18 at the bottom of the rack. Each section includes a rectangular side wall frame 19 which supports a foraminous wall member 20, which may be formed of expanded metal. The frame of the section 16 also includes a top wall 21 which extends across to the top portion of the frame 19 of the section 17; and said section 17 includes a bottom wall 22 which is connected by the hinges 18 to the bottom part of the frame 19 of the section 16. The foraminous portion 20 of the section 16 also includes a plurality of pins or spikes 23 which extend inwardly therefrom and on which pieces of meat 24 or other items to be cooked are impaled and thereby supported. Front portions of the frames 19 are provided with handles 25 by means of which the rack 15 may be slid into or from the cabinet 6 on the channel guides 13 and 14, and by which the rack 15 can be opened for applying food items thereto or for removing food items therefrom, and thereafter closed.

A pair of corresponding electrical heating elements 26 are disposed in the cabinet 6 adjacent and substantially parallel to the side walls thereof. The heating elements have end portions extending upwardly through the top wall of the cabinet, by which said heating elements are supported, and which portions terminate in electric plugs 27 which extend upwardly from said top wall, and each of which is adapted to be connected to a source of electric current, not shown. The electric plugs 27 may be equipped with the transformers having reostats, not shown, for regulating the voltage supplied to the heating elements for varying the cooking rate. Each heating element 26 is provided with a number of spacer members or standoffs 28 which are carried thereby and bear against the adjacent side wall for maintaining the heating elements spaced therefrom. The heating elements 26 are also provided with apertured supports 29 to be engaged by the hooked upper ends of hangers 30 which support food flavoring packets 31.

Figure 1:
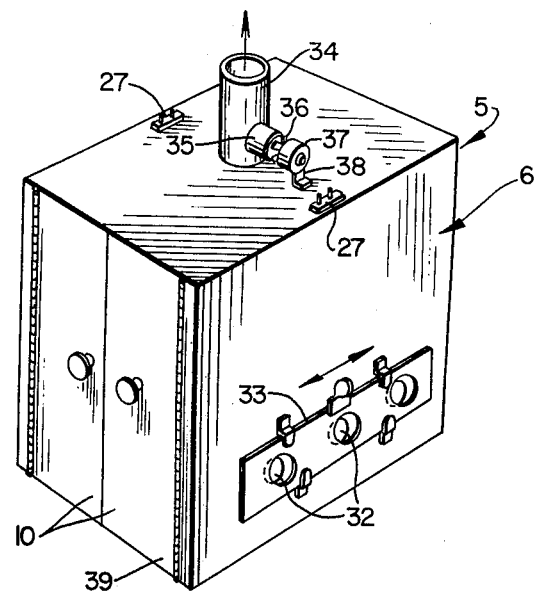
FIG. 1 is a perspective view of the electric broiler.

The side walls of the cabinet 6 are provided with air inlet openings 32 located beneath and adjacent the food packets 31. Dampers 33 for varying the size of the openings 32 are slidably mounted on the outer sides of the cabinet side walls, as seen in FIGS. 1 and 2. An outlet or vent in the form of a stack 34 extends through and upwardly from the top wall of the cabinet, and an elbow shaped induction tube 35 has an upright upwardly opening end disposed within the stack 34, and a horizontal end extending outwardly from said stack and terminating adjacent a fan 36, driven by a variable speed electric motor 37, mounted on a bracket 38.

From the foregoing, it will be readily apparent that when the plugs 27 are connected to sources of electric current that the heat from the elements 26 will cook food items 24 contained in the rack 15. Assuming that the doors 10 are in closed positions, as seen in FIG. 1, with the dampers open or partly open, air will be drawn into the cabinet 6 through the openings 32 by the suction created in the stack 34, due to the air being propelled inwardly and upwardly through the induction tube 35 by the fan 36. The heat from the elements 26 will vaporize the flavoring material of the packets 31, which vapors will be picked up by the air entering through the openings 32 for flavoring the food products 24 while they are being cooked. Grease from the food products 24 will drain through the sheet 12 into the drawer 11 from which the grease can be drained off to waste or storage by a tube, not shown, connected to a tube 39 which extends removably through one of the doors 10, through the front wall of the drawer 11 and which opens into the interior of said drawer.

Various modifications and changes are contemplated and may be resorted to, without departing from the function or scope of the invention.

I claim as my invention:

1. An electric broiler including a cabinet having a top wall, bottom wall, side walls, a rear wall and a front wall, said front wall having an access opening, a closure for said access opening, a food containing rack detachably mounted in said cabinet for movement through said access opening, said rack being formed of hingedly connected sections each having a foraminous side wall, food supporting elements mounted on at least one of said sections, electrical heating elements disposed in said cabinet between said side walls and the rack and having portions extending through and secured in said top wall, said portions having terminals disposed externally of the cabinet for connection to an electric current source, air inlet ports formed in bottom portions of the side walls and adjacent portions of the heating elements, food flavoring packets supported by the heating elements above and adjacent said air inlet ports for supplying food flavoring vapors to the air entering the cabinet for flavoring food contained in the rack, a stack opening through and extending upwardly from said top wall, an induction tube having a discharge end disposed in said stack and opening upwardly and an opposite inlet end projecting laterally from the stack, blower means discharging into said inlet end for extracting air and smoke from the cabinet, and damper means regulating the air inlet ports for regulating the rate of flow of the air, flavoring vapors and smoke through said rack and stack.

2. An electric broiler as in claim 1, said cabinet having channel guides slidably supporting and detachably mounting the rack.

3. An electric broiler as in claim 2, a drawer slidably mounted on said cabinet bottom wall, and a flame resistant foraminous sheet disposed in the cabinet above said drawer and beneath the rack and rack guides and through which grease from the items being cooked can drain into said drawer.

* * * * *